US012657689B2

(12) United States Patent
Remillard

(10) Patent No.: US 12,657,689 B2
(45) Date of Patent: Jun. 16, 2026

(54) SUBSTRATE DEFECT-DETECTION AND COMPARISON

(71) Applicant: Onto Innovation Inc., Wilmington, MA (US)

(72) Inventor: Jason Paul Remillard, Groton, MA (US)

(73) Assignee: Onto Innovation Inc., Wilmington, MA (US)

( * ) Notice: Subject to any disclaimer, the term of this patent is extended or adjusted under 35 U.S.C. 154(b) by 292 days.

(21) Appl. No.: 18/235,122

(22) Filed: Aug. 17, 2023

(65) Prior Publication Data

US 2024/0062361 A1 Feb. 22, 2024

Related U.S. Application Data

(60) Provisional application No. 63/371,806, filed on Aug. 18, 2022.

(51) Int. Cl.
*G06T 7/00* (2017.01)
*G01N 21/88* (2006.01)
(Continued)

(52) U.S. Cl.
CPC ......... *G06T 7/001* (2013.01); *G01N 21/8851* (2013.01); *G06T 3/4046* (2013.01);
(Continued)

(58) Field of Classification Search
CPC . G06T 2207/20081; G06T 2207/20084; G06T 2207/30148; G06T 3/4046;
(Continued)

(56) References Cited

U.S. PATENT DOCUMENTS

| | | | | |
|---|---|---|---|---|
| 11,967,060 | B2 * | 4/2024 | Narasimhan | .......... G06T 7/0004 |
| 2019/0287761 | A1 * | 9/2019 | Schoenmakers | ........ G06T 7/174 |

(Continued)

FOREIGN PATENT DOCUMENTS

| | | |
|---|---|---|
| CN | 111768398 | 10/2020 |
| TW | 202208832 | 3/2022 |

(Continued)

OTHER PUBLICATIONS

"Taiwanese Application Serial No. 112130928, Office Action mailed Jun. 6, 2024", with machine English translation, 17 pages.
(Continued)

*Primary Examiner* — Gregory A Morse
*Assistant Examiner* — Stefano Anthony Dardano
(74) *Attorney, Agent, or Firm* — Schwegman Lundberg & Woessner, P.A.

(57) ABSTRACT

Various examples described herein include image-processing tasks of image data used for defect detection and comparison of features on substrates. At least one of a deep-convnet-based and a transformer-based backbone network (a common backbone) that is arranged to convert various types of raw-image data into features that can, in turn, be used by smaller neural networks to perform final calculations of specific tasks. The smaller neural networks perform, for example, final defect-detections, die-to-die image comparisons, anomaly detection, and customer-specific tasks in a fabrication facility. The common-backbone network can initially be trained using self-supervised learning based on the raw-image data, and then transfer learning can be used to train a final application of the task-specific networks. Other systems and methods are also disclosed.

24 Claims, 6 Drawing Sheets

(51) Int. Cl.

| | |
|---|---|
| *G06T 3/4046* | (2024.01) |
| *G06T 7/33* | (2017.01) |
| *G06V 10/44* | (2022.01) |
| *G06V 10/764* | (2022.01) |
| *G06V 10/774* | (2022.01) |
| *G06V 10/82* | (2022.01) |
| *G06V 20/50* | (2022.01) |

(52) U.S. Cl.

CPC ................ *G06T 7/33* (2017.01); *G06V 10/44* (2022.01); *G06V 10/764* (2022.01); *G06V 10/7753* (2022.01); *G06V 10/82* (2022.01); *G06V 20/50* (2022.01); *G01N 2021/8887* (2013.01); *G06T 2207/20081* (2013.01); *G06T 2207/20084* (2013.01); *G06T 2207/30148* (2013.01)

(58) Field of Classification Search

CPC ........ G06T 7/001; G06T 7/33; G06T 7/0004; G06T 2207/10061; G06T 7/0008; G06T 11/00; G06T 2200/28; G06T 2207/10024; G06T 2207/10056; G06T 2207/20021; G06T 2207/20024; G06T 2207/20056; G06T 2207/20061; G06T 2207/20076; G06T 2207/30108; G06T 5/70; G06T 5/77; G06T 7/0006; G06T 7/174; G06T 7/30; G06T 7/60; G06T 2207/10004; G06T 7/0002; G06T 2207/10016; G06T 2207/30141; G06T 7/73; G06V 10/44; G06V 10/764; G06V 10/7753; G06V 10/82; G06V 20/50; G06V 10/454; G06V 10/806; G06V 10/762; G06V 20/52; G06V 20/56; G06V 20/58; G06V 10/255; G06V 40/171; G06V 10/25; G06V 10/776; G06V 40/172; G06V 10/774; G06V 10/42; G06V 10/422; G06V 10/48; G06V 10/89; G06V 10/40; G06V 2201/06

See application file for complete search history.

(56) References Cited

U.S. PATENT DOCUMENTS

| | | | |
|---|---|---|---|
| 2021/0012136 A1 | 1/2021 | Zhang et al. | |
| 2021/0035833 A1* | 2/2021 | Feng .................... | G01N 23/201 |
| 2021/0209343 A1 | 7/2021 | Guo et al. | |
| 2021/0287352 A1 | 9/2021 | Calderon et al. | |
| 2021/0334587 A1 | 10/2021 | Wang | |
| 2021/0366103 A1 | 11/2021 | Zhang et al. | |
| 2022/0334172 A1* | 10/2022 | Hayakawa ............. | H01L 22/12 |
| 2023/0011901 A1* | 1/2023 | Palme ................... | G06N 3/096 |
| 2023/0401825 A1* | 12/2023 | Akkaya ................. | G06N 3/045 |
| 2024/0005275 A1* | 1/2024 | Leppänen .......... | G06Q 10/0875 |
| 2025/0117920 A1* | 4/2025 | Erol ..................... | G06T 7/0008 |

FOREIGN PATENT DOCUMENTS

| | | |
|---|---|---|
| TW | 202215037 | 4/2022 |
| TW | 202424469 | 6/2024 |
| WO | 2022127299 | 6/2022 |
| WO | 2022130762 | 6/2022 |
| WO | 2024039785 | 2/2024 |

OTHER PUBLICATIONS

"International Application Serial No. PCT US2023 030475, International Search Report mailed Dec. 4, 2023", 3 pgs.

"International Application Serial No. PCT US2023 030475, Written Opinion mailed Dec. 4, 2023", 7 pgs.

"Taiwanese Application Serial No. 112130928, Response filed Dec. 5, 2024 to Office Action mailed Jun. 6, 2024", with English claims, 13 pages.

"International Application Serial No. PCT US2023 030475, International Preliminary Report on Patentability mailed Feb. 27, 2025", 9 pages.

"Taiwanese Application Serial No. 112130928, Decision of Rejection mailed May 29, 2025", with manual English translation, 11 pages.

* cited by examiner

300

301
RECEIVE RAW-IMAGE DATA

303
SELF-SUPERVISED TRAINING BASED ON DATA

305
RECEIVE IMAGES FROM TASK-SPECIFIC NETWORKS

307
PERFORM ANOMALY DETECTION/CLASSIFICATION OF IMAGES

309
CONVERT RAW-IMAGE DATA

311
EXTRACT IMAGE FEATURES (OPTIONAL)

313
ALIGN/SCALE IMAGES IMAGE FEATURES (OPTIONAL)

400

SUBSTRATE DEFECT-DETECTION AND COMPARISON

CLAIM OF PRIORITY

This patent application claims priority to U.S. Provisional Application Ser. No. 63/371,806, entitled, "SUBSTRATE DEFECT-DETECTION AND COMPARISON," filed 18 Aug. 2022; the disclosure of which is incorporated herein by reference in its entirety.

TECHNOLOGY FIELD

The disclosed subject matter is related generally to the field of substrate metrology and/or inspection equipment used in the fabrication or manufacturing facilities. More specifically, in various embodiments, the disclosed subject matter is related to image-processing tasks of image data used for defect detection and comparison of features on substrates.

BACKGROUND

State-of-the-art algorithms for image-processing tasks are used in tasks such as facial recognition, human-pose estimation, semantic segmentation (e.g., assigning labels to each pixel in an image or partitioning a digital image into a plurality of image segments), and template matching are currently used in various social media and other platforms. These algorithms typically rely on some type of deep convolution-neural-networks (convnets or CNNs). These convnets can outperform the state-of-the-art algorithms from 20 years ago.

However, there are significant engineering challenges that prevent the adoptions of these high-performance algorithms in environments such as images captured by metrology and inspection of substrates used in, for example, a semiconductor-fabrication facility. The challenges include throughput of substrates and acquiring a sufficient amount of training data from the substrates.

The throughput issues (e.g., substrates per hour processed) are due to the time required for the computations for image-processing tasks such as anomaly detection, classification, and feature locations of various types of features (e.g., 3D bump patterns, water marks, etc.) and devices (e.g., an integrated circuit device or patterns on various layers of memory devices) formed on substrates. The acquisition of training data is based on current classification of limited data types procured by, for example, a single device manufacturer.

The throughput and training-data issues are addressed herein.

SUMMARY

This document describes, among other things, a backbone network (a common backbone), that is arranged to convert various types of raw-image data into features that can, in turn, be used by smaller neural networks to perform final calculations of specific tasks in fabrication facilities. The common backbone can be, for example, based on a machine-learning-base network, such as a deep-convnet-based network or a transformer-based network. The smaller neural networks perform, for example, final defect-detections, die-to-die image comparisons, anomaly detection, and customer-specific tasks in the fabrication facility. The common-backbone network can initially be trained using self-supervised learning based on the raw-image data, and then transfer learning can be used to train a final application of the task-specific networks.

In various embodiments, the disclosed subject matter is a system to provide comparison data in a fabrication facility. The system includes a common-backbone network based on, for example, a machine-learning-base network, such as a deep-convnet-based network or a transformer-based network. The common-backbone network includes an input component to receive raw-image data; a self-supervised training component to generate a machine-learning-based (e.g., a convnet-network-based based or a transformer-network based) comparison database from the raw-image data; and an analysis engine to perform anomaly detection and classification of images received from a plurality of task-specific networks electronically coupled to the common-backbone network. Each of the plurality of task-specific networks is coupled to at least one type of equipment selected from an equipment type including a metrology tool and an inspection tool, the analysis engine to convert the raw-image data into features that are to be transmitted to the plurality of task-specific networks to perform final calculations of specific tasks within the fabrication facility.

In various embodiments, the disclosed subject matter is an image-processing system to categorize defects in a fabrication facility. The image-processing system including a common-backbone network based on, for example, a machine-learning-base network, such as a deep-convnet-based network or a transformer-based network; and a plurality of task-specific networks electronically coupled to the common-backbone network. Each of the plurality of task-specific networks is based on, for example, a machine-learning-base network, such as a deep-convnet-based network or a transformer-based network, with each of the plurality of task-specific networks configured to be trained for a specific task within the fabrication facility.

In various embodiments, the disclosed subject matter is a method for comparing data in a fabrication facility. The method including receiving raw-image data as inputs to a common-backbone network, where the common-backbone network is based on, for example, a machine-learning-base network, such as a deep-convnet-based network or a transformer-based network; using self-supervised training for generating a machine-learning (e.g., a convnet-based or transformer-based) comparison database from the raw-image data; performing anomaly detection and classification of images received from a plurality of task-specific networks electronically coupled to the common-backbone network; and converting the raw-image data into features and transmitting the features to the plurality of task-specific networks.

BRIEF DESCRIPTION OF FIGURES

Various ones of the appended drawings merely illustrate example implementations of the present disclosure and should not be considered as limiting its scope.

DETAILED DESCRIPTION

The disclosed subject matter is directed to image analysis and classification within a fabrication facility (e.g., a semiconductor fabrication facility). In various embodiments, a common backbone is arranged to convert various types of raw-image data into features that can, in turn, be used by smaller neural networks to perform final calculations of specific tasks in fabrication facilities. The common backbone can be, for example, a deep-convnet-based network or a transformer-based network. The smaller neural networks perform, for example, final defect-detections, die-to-die image comparisons, anomaly detection, and customer-specific tasks. The common-backbone network can initially be trained using self-supervised learning based on the raw-image data, and then transfer learning can be used to train a final application of the task-specific networks.

As disclosed herein, a machine-learning framework, such as a convolutional neural-network (CNN or convnet), may be used to process image data. Processing image data includes, for example, finding spatial relationships within captured images to determine features or characteristics of devices or features on substrates as described herein. A generalized example of a machine-learning framework that can be used with the disclosed subject matter is described in more detail below.

Convolutional-neural networks (convnets or CNNs) can perform image-processing tasks such as anomaly detection, classification, and feature locations of various types of features (e.g., 3D bump patterns, water marks, etc.) and devices (e.g., an integrated circuit device or patterns on memory devices) formed on substrates. Such substrates are used in the semiconductor and allied industries. However, each of the image-processing tasks described is highly computationally intensive, thereby typically requiring a great deal of time to process each image. Further, these tasks require a significant amount of data, as an input, to the various convnets for comparison with and classification of images captured by metrology and inspection tools.

Figure 6:
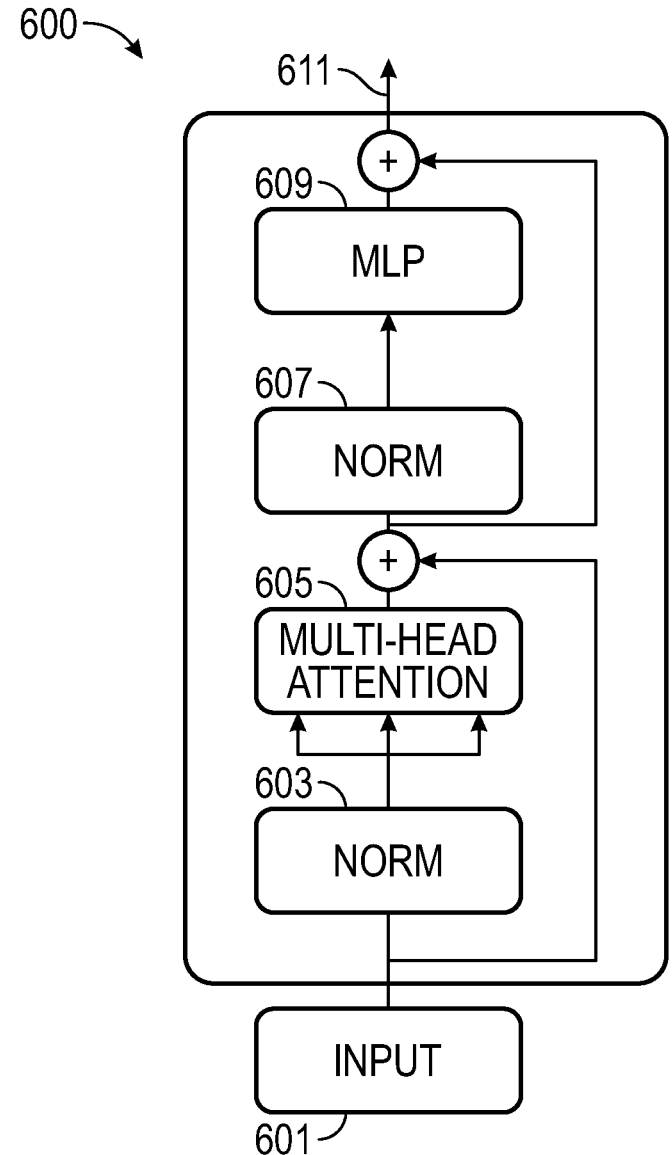
FIG. 6 shows an exemplary embodiment of a transformer encoder that can be used in a transformer-based network.

Although various embodiments are described in terms of a convolutional-neural network, other types of networks may be used as well. For example, instead of or in addition to using layers of convolutional networks, a transformer-based network can use N-transformer encoder blocks, that stack up similarly to the layers in the convnet. An exemplary embodiment of a transformer encoder 600 that can be used in a transformer-based network is shown in FIG. 6.

Instead of passing multi-channel images between the layers, the images are compressed to an N-dimensional vector. The transformer encoder 600 takes in a vector, and emits a vector, allowing the vectors to be stacked. The lowest-layer input vector is a linear transform on all the image patches (e.g., 16×16 pixels) to the base vector. Inside the transformer encoder block, multiple "attention heads" looks for interesting blocks (e.g., via a dot product), that gets added to a skip connection, and then into a multi-layer perception (MLP) block which is a multiple linear-activations layers stacked up.

Attention heads allow the neural network to learn relationships across an image that do not need to be adjacent to each other or be present when the resolution is lowered like a convnet. A possible tradeoff over a convnet is that training the backbone network requires additional images, plus extra training computational time and/or intensity.

With regard to the amount of data used as an input, traditionally millions of hand-labeled images are used to train the machine-learning components of a convnet-based or transformer-based network. The available images for input to the networks are typically "out-of-distribution" (e.g., not within tolerance levels for such a feature that was imaged). Such out-of-distribution images are generalized and are therefore not specifically adaptable for a particular combination of metrology or inspection tools for comparison with, for example, another similar feature located on the same substrate. Further, these out-of-distribution images cannot be used for comparison or correlated to similar features on an architecture of a given feature or device (e.g., a particular layout of a transistor within a particular fabrication facility of a device manufacturer).

However, the manufacturer of a metrology or inspection tool can collect a significant amount of data, for example, in collaboration with a number of fabrication facilities of one or several device manufacturers, in addition to what each may have already collected, stored, and characterized. Therefore, data from a metrology-tool or inspection-tool manufacturer can be used to develop self-supervised training algorithms. Such data can be used to train a large-backbone network without a requirement for labeling each component of data.

In various embodiments of the disclosed subject matter, multi-headed deep convolution-neural-networks (convnet) or transformer-based can be used to perform operations such as defect detection and die-to-die comparisons on substrates. These multi-headed networks allow specific machine-learning algorithms to run substantially in real time on a metrology or an inspection tool.

A generalized architecture, described in more detail below, consists of a deep-convnet-based or transformer-based backbone network (a common backbone), that converts raw-image data into features that can, in turn, be used by smaller neural networks to perform final calculations of specific tasks. The smaller networks perform, for example, final defect-detections, die-to-die image comparisons, anomaly detection, and customer-specific tasks. The common-backbone network can initially be trained using self-supervised learning, and then transfer learning can be used to train a final application of the task-specific networks.

Therefore, in the disclosed subject matter, a convnet-based, or transformer-based, common-backbone can analyze most or all types of defects found on a substrate. The common-backbone network can be used for all metrology and inspection tools for a tool manufacturer. Any number of task-specific networks can be coupled electronically to the common-backbone network (e.g., hardwired, wirelessly coupled, or otherwise in electronic communication). The combination of the convnet-based or transformer-based, common-backbone network with the smaller task-specific networks are referred to herein as multi-headed networks.

Multi-headed networks allow the reuse of the computationally expensive convolution networks. Although remaining embodiments are described in terms of a convnet, a transformer-based network, as disclosed above, may be used instead of or in addition to the convnet.

Figure 1:
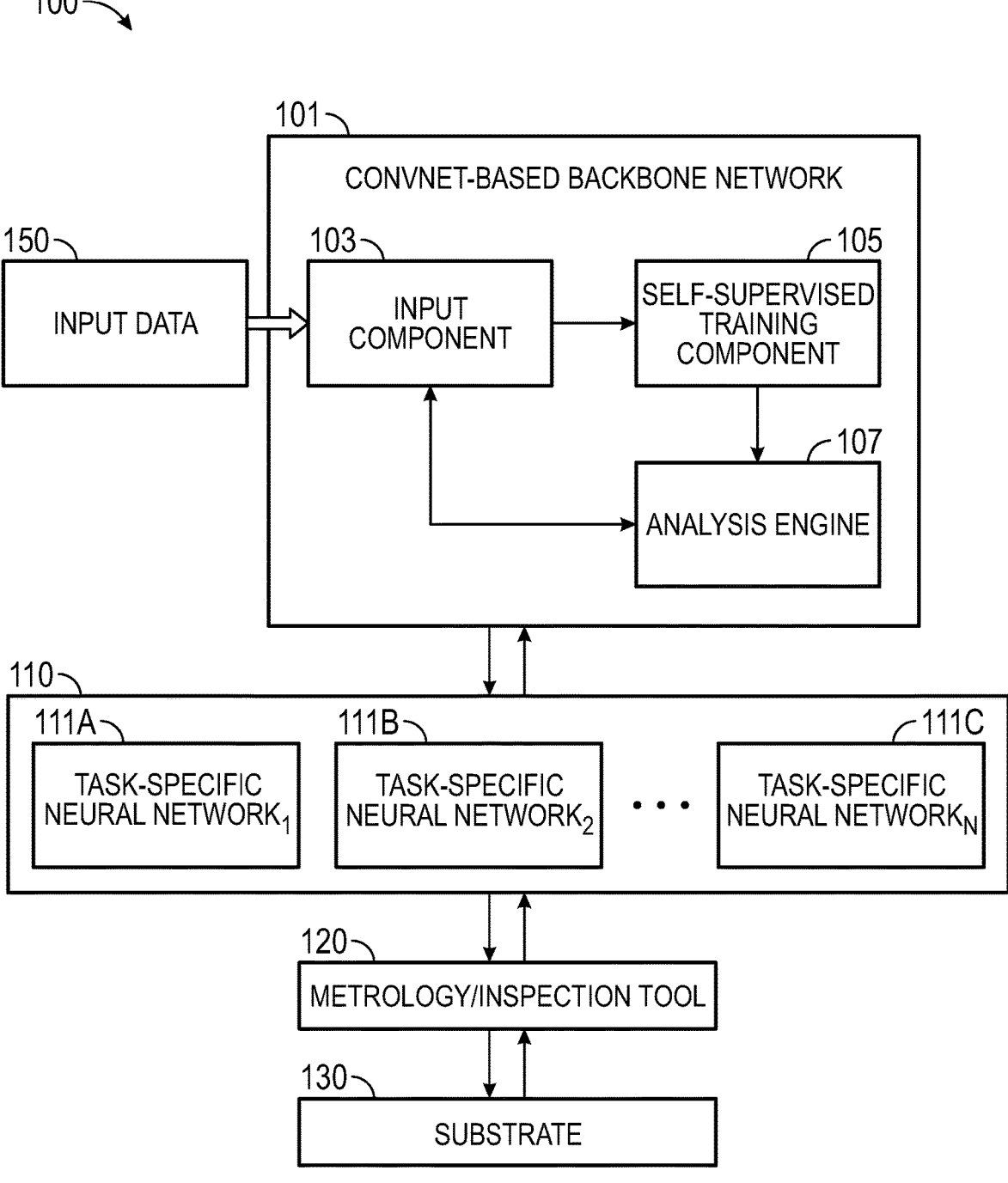
FIG. 1 shows an example of a multi-headed convolutional neural-network (convnet) having a backbone network coupled to a number of smaller networks, in accordance with various embodiments of the disclosed subject matter.

FIG. 1 shows an example of a multi-headed convolutional neural-network (convnet) 100 having a convnet-based backbone network coupled to a number of smaller networks, in accordance with various embodiments of the disclosed subject matter. FIG. 1 is shown to include an input data component 150 coupled to the convnet-based backbone network 101. The convnet-based backbone network 101 is further coupled, for example, wirelessly or otherwise in electronic communication with, a number of smaller networks 110. The smaller networks 110 include, for example, task-specific neural network₁ 111A, and task-specific neural network₂ 111B through task-specific neural network_N 111C. At least one of the task-specific neural networks 111A-111C is electronically coupled to at least one of a metrology tool and an inspection tool 120 within, for example, a semiconductor-fabrication facility. In embodiments, the backbone network 101 may be considered as an encoder using a transformer-based network as described below, with reference to FIG. 6. In embodiments, the backbone network 101 may use a hybrid arrangement of a convnet-based network and a transformer-based network.

The metrology tool and the inspection tool 120 are used to determine metrology-related information from, or view features on, a substrate 130. The substrate 130 may comprise a wafer formed from an elemental semiconductor (e.g., silicon or germanium), a wafer formed from a compound semiconductor (e.g., gallium arsenide (GaAs) or gallium nitride (GaN)), or a variety of other substrate types known in the art (including conductive, semiconductive, and nonconductive substrates). Consequently, the substrate 130 may comprise, for example, any one or more of 400 mm, 300 mm, 200 mm, 150 mm, 125 mm, and 100 mm round substrates (e.g., wafers), including opaque (e.g., at visible wavelengths), clear, and bonded substrates. The substrate 130 may also comprise various types of non-round (e.g., square, rectangular, polygonal, etc.) substrates including quartz photomasks (e.g., with or without a pellicle), flat-panel displays, or thin-film heads used in the data-recording industry. The substrate 130 may also be formed from non-rigid materials such as polyethylene-terephthalate (PET) having films deposited thereon or otherwise formed with a semiconducting layer, as used in the manufacture of mobile devices (e.g., cellular phones).

A metrology tool is used to measure various features on or characteristics of the substrate 130. The various features and characteristics may comprise, for example, film thickness measurements, critical-dimensions (CD) measurements (in x-dimensions, y-dimensions, and/or z-dimensions) of features formed on a substrate, a pitch of line-space features formed on a substrate, an overlay offset from one layer to another on the substrate, or a number of other measurements known to a person of ordinary skill in the art. An inspection tool can be used to check for compliance of features formed on or otherwise found on a substrate. For example, the inspection can be of a substrate upon which integrated circuit dice have been fabricated, locations of the dice, locations of unwanted particulate matter or other unwanted or unplanned features, and so on. However, the metrology tool and the inspection tool 120 often use some basis for comparison for each of the features measured or identified on the substrate 130. In the disclosed subject matter provided herein, the data, objects, or components used from such a comparison can be obtained from image data provided to the input data component 150, and transferred to the convnet-based backbone network 101.

The input data component 150 can include a number of different image-based data types. The different image-based data types are provided so that the metrology tool and/or inspection tool 120 can compare an image captured from the substrate 130 with an image having the same or similar characteristics. The characteristics and types of image-based data types are described in more detail with reference to FIG. 2, below. The input data component 150 provides the different image-based data types to an input component 103. The input component 103 may comprise, for example, a memory or storage unit within the convnet-based backbone network 101.

Further, although FIG. 1 shows the input data component 150 as being separate from the convnet-based backbone network 101, the drawing is provided merely for convenience in understanding the disclosed subject matter. In some embodiments, the input data component 150 may be located within or proximate to (e.g., hardwired or electronically coupled directly to) the convnet-based backbone network 101. In other embodiments, the input data component 150 may be located distally from the convnet-based backbone network 101. In the latter embodiment, the input data component 150 may be located in another part of a fabrication facility, in another facility separated from the fabrication facility, or in another part of the world. That is, the input data component 150 may be geographically and physically separated from the convnet-based backbone network 101. However, the input data component 150 is either in electronic communication with (e.g., wirelessly) the convnet-based backbone network 101 or is periodically electronically coupled to the convnet-based backbone network 101 to provide raw-image data inputs. Although the input data component 150 may be electronically coupled to the convnet-based backbone network 101 at all times, there is no need for the constant electronic coupling to occur. The image data from the input data component 150 may be updated only occasionally. Additionally, image data within or transferred to the input data component 150 can include, for example, 2D and 3D data from multiple image sources, such as fluorescence data, color-filtering data, etc., as well as other various data types received from various types of sensors, including optical sensors. Also, a fusion of different types of images, including multi-channel imagery and data, may be used as an input to the convnet-based backbone network 101, the transformer encoder 600 of FIG. 6, or a hybrid on the two networks.

The self-supervised training component 105 is coupled to the input component 103 to prepare a convnet-based comparison database. The convnet-based comparison database uses the different image-based data types to compare to images captured from the task-specific neural networks 111A-111C within an analysis engine 107. The analysis engine 107 may include a number of hardware-based processors and can perform, for example, anomaly detection and classification of images received from one or ones of the task-specific neural networks 111A-111C electronically coupled to the convnet-based backbone network 101. The task-specific neural networks 111A-111C can therefore be relatively small (e.g., limited in computing power) since all main processing has been or can be performed by the analysis engine 107 within the convnet-based backbone network 101.

The task-specific neural networks 111A-111C are coupled to the convnet-based backbone network 101 and can be trained for a specific end-user of the network. Each of the task-specific neural networks 111A-111C can also include smaller convnet-based networks to perform comparison tasks that may be less computationally-intensive than the convnet contained within the convnet-based backbone net-work 101. Therefore, various tasks can be divided and handled by various parts of the multi-headed convolutional neural-network 100. Therefore, at least a portion of the input data to the task-specific neural networks 111A-111C is provided from an output of the convnet-based backbone network 101. Consequently, the multi-headed convolutional neural-network 100 allows computationally-expensive data to be reused by a number of different task-specific neural networks located at different facilities in a number of different geographic regions and with a number of different device manufacturers.

Additionally, each of the task-specific neural networks 111A-111C can be customized via task-specific recipes. For example, comparison tasks, described in more detail below, can sort through what are considered normal changes for a particular process (e.g., normal process-variations or toler-ance values). These normal changes can then be ignored by the task-specific neural networks 111A-111C. Therefore, in this example, only detected features or anomalies that are interesting to a process engineer can be noted and high-lighted. These detected features or anomalies may then be transmitted to the convnet-based backbone network 101 for further analysis in the analysis engine 107. In embodiments, the detected features or anomalies can be analyzed, at least partially, by hardware-based processors within one or more of the task-specific neural networks 111A-111C, relying on information provided by the convnet-based backbone net-work 101. In other embodiments, the task of analyzing the detected features or anomalies can be split between the analysis engine 107 and one or more of the task-specific neural networks 111A-111C. In various embodiments, the task-specific neural networks 111A-111C may be considered as a decoder using a transformer-based network as described below, with reference to FIG. 6, such as a multi-head attention block 605 that can be used to sort visual informa-tion. In embodiments, one or more of the task-specific neural networks 111A-111C may use a hybrid arrangement of a convnet-based network and a transformer-based network.

Tasks performed by the task-specific neural networks 111A-111C can include, for example, comparing CAD images to the actual images captured by a metrology tool, comparing actual images captured by a metrology tool to a plurality of known-defect types, comparing one planned die to another planned die of the same type on a substrate, as well as performing other tasks to verify whether any issues exist with features/devices formed on the substrate 130. These task are described in more detail with reference to FIG. 2, below.

Figure 2:
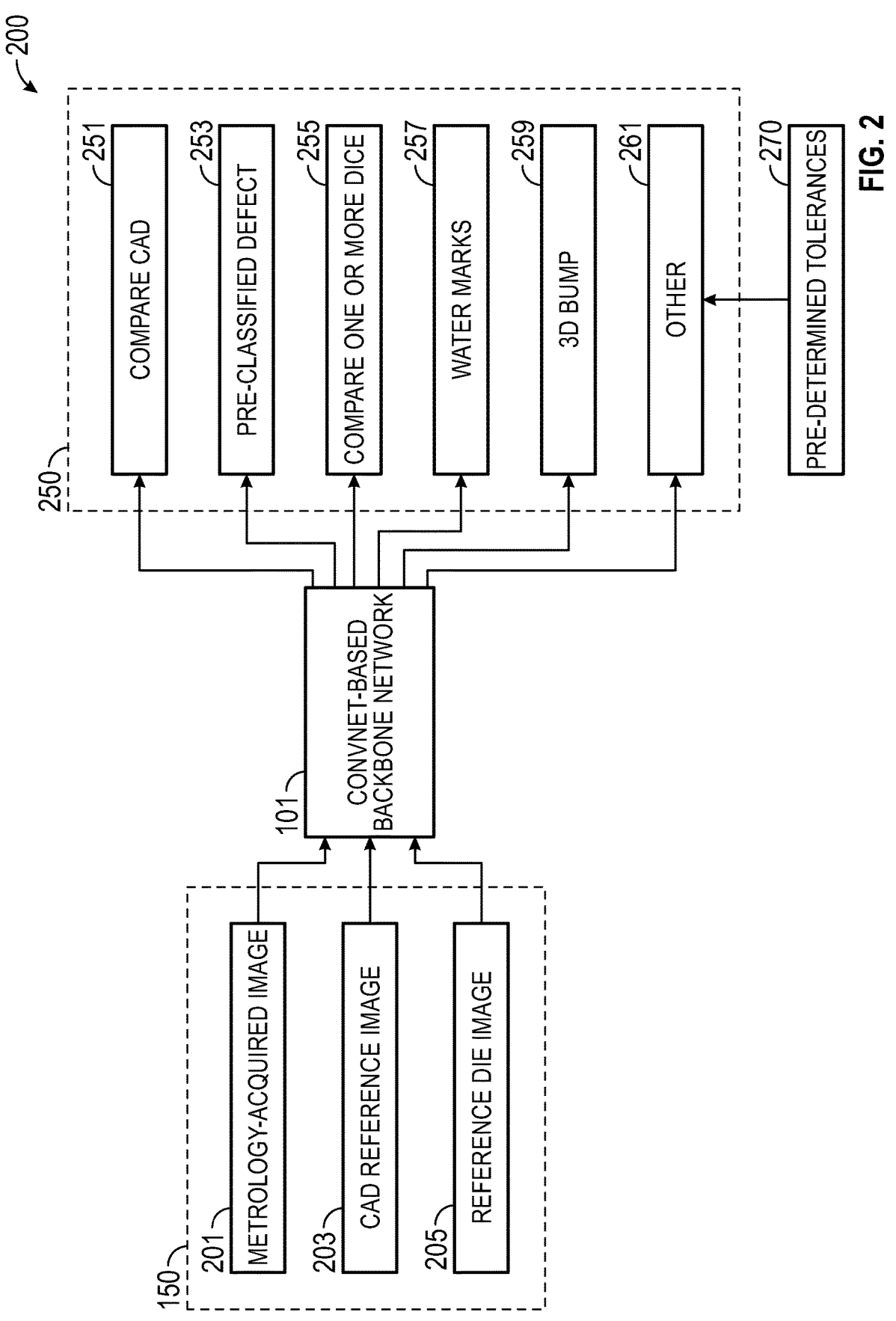
FIG. 2 shows an example with additional details of portions of the multi-headed convolutional neural-network of FIG. 1.

Referring now to FIG. 2, an example with additional details 200 of portions of the multi-headed convolutional neural-network 100 of FIG. 1 is shown. The input data component 150 is shown to include several examples of input image-data types including, for example, a metrology-acquired image type 201, a CAD reference image type 203, and a reference-die image type 205. A comparison module 250 provides examples of comparison types that may be analyzed within the analysis engine 107 of FIG. 1 with results from the comparison module 250 provided to the task-specific neural networks 111A-111C. In various embodiments, the comparison module 250 may be located entirely within the convnet-based backbone network 101. In other embodiments, the comparison module 250 may be located entirely within one or more of the task-specific neural networks 111A-111C. In still other embodiments, portions of the comparison operations of the comparison module 250 may occur within the convnet-based backbone network 101, while other portions of the operations are performed within one or more of the task-specific neural networks 111A-111C. In other embodiments, the compari-son operations of the comparison module 250 may occur within the convnet-based backbone network 101 and be duplicated on one or more of the task-specific neural net-works 111A-111C.

The metrology-acquired image type 201 can include a large number of metrology images previously collected by, for example, the manufacturer of a particular type of metrol-ogy tool. The metrology-acquired image type 201 can also include images collected from dozens or hundreds of ver-sions of the same or similar metrology tool used by device manufactures. Consequently, the number of metrology images available for input to the convnet-based backbone network 101 can include millions of images collected over a period of many years.

The CAD reference image type 203 can include, for example, an image of a two-dimensional layout of how each layer of a particular device is expected to appear to a metrology tool or a visual-inspection tool. The CAD refer-ence image type 203 can also include CD measurements of various objects on a given layer.

The reference-die image type 205 can include an image of, for example, a completed die or dice for a given device type. The reference-die image type 205 may comprise an actual image of a known-good die collected previously from a metrology tool or a visual-inspection tool.

Each of the examples of input image-data types 201, 203, 205, may be organized and classified within the self-super-vised training component 105 (see FIG. 1). Typically, to train a large backbone network from scratch, hundreds of thousands of human-labeled images or more would be needed for the training. However, the self-supervised train-ing component 105 eliminates a need to label the image-data types. Various image-data types, including those described above, are used to train the convnet-based backbone net-work 101. For example, various semiconductor-metrology and inspection tool manufacturers, as well as fabrication facilities using those metrology and inspection tools, have access to extremely large databases of collected images acquired over many years.

Semiconductor-device manufacturers have provided raw images for entire substrates, along with outputs of the metrology and inspection systems. Such images are avail-able from, for example, front-end of line (FEOL) and back-end of line (BEOL) processes, and the images have been taken at different magnifications and using different light sources, including from the frontside and edges of substrates. The images have been acquired from, for example, CMOS logic-device manufacturers, power-elec-tronics manufacturers, LED manufacturers, camera-sensor manufacturers, and a variety of other manufacturing facili-ties. Libraries providing the various image-data types can be maintained and used within the convnet-based backbone network 101 for future machine-learning input data.

As described above, the comparison module 250 provides examples of comparison types that may be used to train the self-supervised training component 105 and analyzed within the analysis engine 107 of FIG. 1. In various embodiments, results from the comparison module 250 may be provided to one or more of the task-specific neural networks 111A-111C. In various embodiments, one or more of the task-specific neural networks 111A-111C may provide image data from at least one of the metrology tool and the inspection tool 120 to the convnet-based backbone network 101 for comparison with the various comparison types within the comparison module 250. In embodiments, a portion of the results from the comparison module 250 may be provided to one or more of the task-specific neural networks 111A-111C while some of the image data from at least one of the metrology tool and the inspection tool 120 is transmitted to the convnet-based backbone network 101 for comparison.

The comparison types include, for example, a comparison from image data collected from the substrate 130 by at least one of the metrology tool and the inspection tool 120 to a CAD-comparison data component 251. The CAD-comparison data component 251 can be output from the analysis engine 107 based on, for example, the CAD reference image type 203 used to train the self-supervised training component 105. A comparison of image data received from at least one of the metrology tool and the inspection tool 120 to the CAD-comparison data component 251 can occur in either or both of the convnet-based backbone network 101 and one or more of the task-specific neural networks 111A-111C. The comparison can be used to determine whether a feature on the substrate 130 being measured or observed is "proper." That is, does the feature meet the expected characteristics (e.g., CD values, overall shape, orientation relative to the remainder of other features on the substrate 130, and other physical factors) within a pre-determined tolerance value. A pre-determined tolerance-value engine 270 can supply the pre-determined tolerance values to the comparison module 250 for each of the examples of comparison types. The pre-determined tolerance-value engine 270 may comprise, for example, a software-based, firmware-based, and/or hardware-based database stored as a lookup table.

The pre-determined tolerance-value engine 270 can provide pre-determined tolerance values for many types of devices. For example, the pre-determined tolerance-value engine 270 can be trained to ignore variations in a measured or inspected substrate that are within manufacturing tolerances. The in-tolerance variations can include process variations, system-to-system variations (e.g., differences between multiple process tools or differences between multiple metrology-tools), XY-alignment differences from one die to another, and others.

In a similar fashion to the CAD reference image type 203, image data received from at least one of the metrology tool and the inspection tool 120 can be compared with a pre-classified defect component 253, a comparison of one or more dice component 255, a comparison with known or determined water marks component 257, a comparison with a three-dimensional bump types component 259, or a comparison with various other comparison types component 261. Each of these other comparison types can also receive a related tolerance value from the pre-determined tolerance-value engine 270.

In various embodiments, comparison types within the pre-classified defect component 253 can include various types of processing defects. The processing defects include types such as bridging or shorting lines, open lines, unopened vias, scratches, particulate defects, or a large number of other defect types encountered by a fabrication facility in producing devices.

Comparison types within the comparison of the one or more dice component 255 can include, for example, a comparison of a memory array or a controller layout to the measured or observed object on the substrate 130. The comparison of the one or more dice component 255 can also include physical, optical, and electrical characteristics such as a refractive index of a film or thickness of a film stack or film layer.

The comparison with the known or determined water marks component 257 can be used to identify various types of water marks on at least a portion of the substrate 130. The comparison can also include a comparison to known or derived chemical marks and stains on at least a portion of the substrate 130.

The comparison with the three-dimensional bump types component 259 can be used to compare a known or desired bump type, including physical size, location, and electrical characteristics (e.g., resistance) to measured or observed values of bumps on the substrate 130.

Each of these comparison types are provided as examples only so that a person of ordinary skill in the art will better understand aspects of the comparison module 250. The comparison types can therefore be expanded, contracted, or redefined as desired for a particular fabrication facility or use.

Based on the various comparisons described above, the analysis engine 107 of FIG. 1 can be used to update the input component 103. By updating the input component 103, the convnet-based backbone network 101 is periodically being refreshed with new data comparisons.

Figure 3:
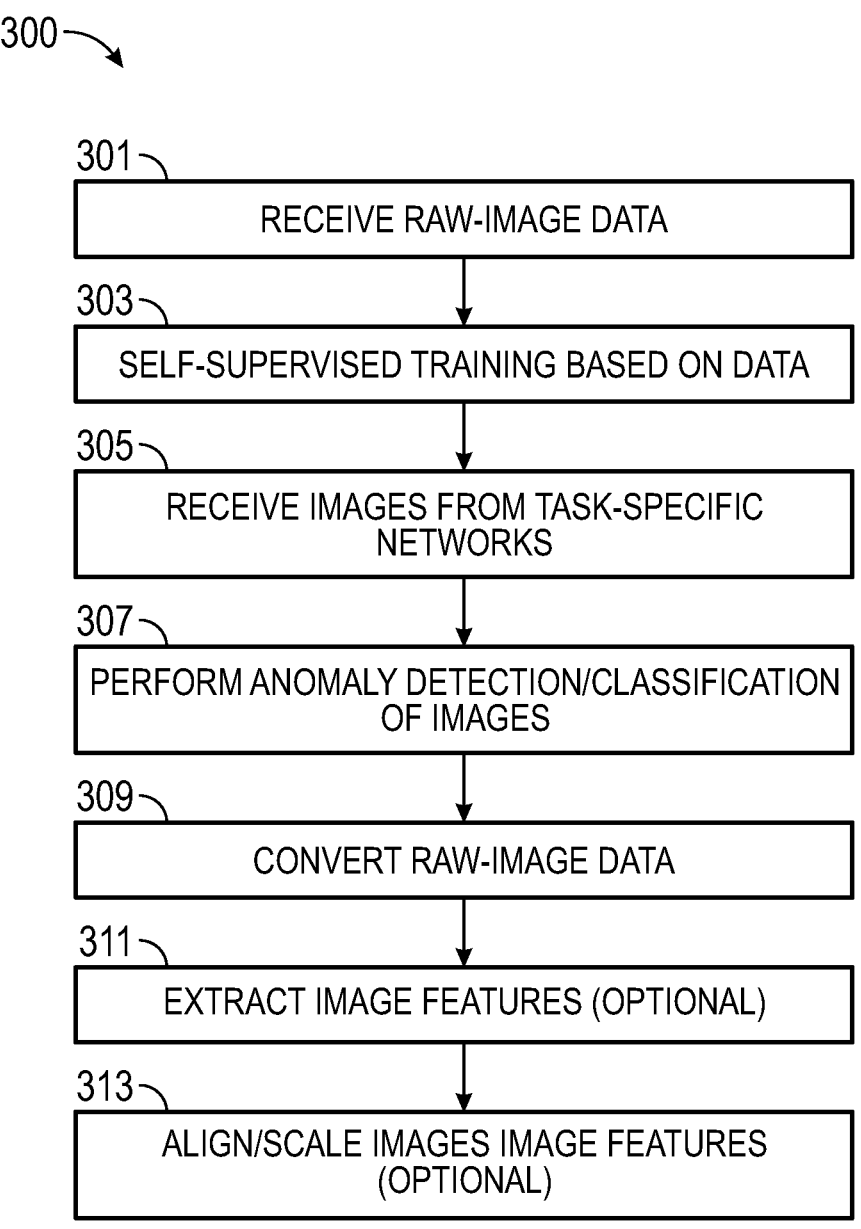
FIG. 3 shows a generalized example of a method for using the multi-headed convolutional neural-network of FIG. 1, in accordance with various embodiments of the disclosed subject matter.

Referring now to FIG. 3, a generalized example of a method 300 for using the convnet-based backbone network 101 of FIG. 1, in accordance with various embodiments of the disclosed subject matter is shown. Although the operations of FIG. 3 are shown in a particular order and as a series of linear steps, a person of ordinary skill in the art will recognize that certain steps may be repeated, skipped, or performed in a different order.

With concurrent reference to FIGS. 1 and 2, the method 300 includes receiving raw-image data at operation 301. The raw-image data may be received from the input data component 150. At operation 303, the self-supervised training component 105 can be trained using the raw-image data.

At operation 305, images either measured or observed from, for example, the substrate 130 by at least one of a metrology tool and an inspection tool 120, are received by the convnet-based backbone network 101 as provided from at least one of the task-specific neural networks 111A-111C. An anomaly detection and classification of the images occurs at operation 307. In embodiments, the anomaly detection and classification can occur entirely within the analysis engine 107 of the convnet-based backbone network 101. In other embodiments, the anomaly detection and classification can occur as a task that is split between the analysis engine 107 or within a processing component of at least one of the task-specific neural networks 111A-111C.

Raw-image data can be converted at operation 309. The conversion of the raw-image data may include, for example, deriving metrology data (e.g., CD measurements, film, thickness data, sheet-resistance values, refractive index values, etc.) form one or both of the raw-image data received at operation 301 or the measured and observed values of the received images at operation 305.

Operation 311 includes an optional step of extracting image features. Extracted features can include extracting data from images that may be indicative of vias that are not fully opened or opened features in line traces on the substrate 130.

At operation 313, an optional step includes aligning and/or scaling images or image features to match a scale or alignment of the received raw-image data at operation 301. Such an alignment or scaling operation may provide for an easier comparison of measured or observed image data with the raw-image data input from the input data component 150.

Figure 4:
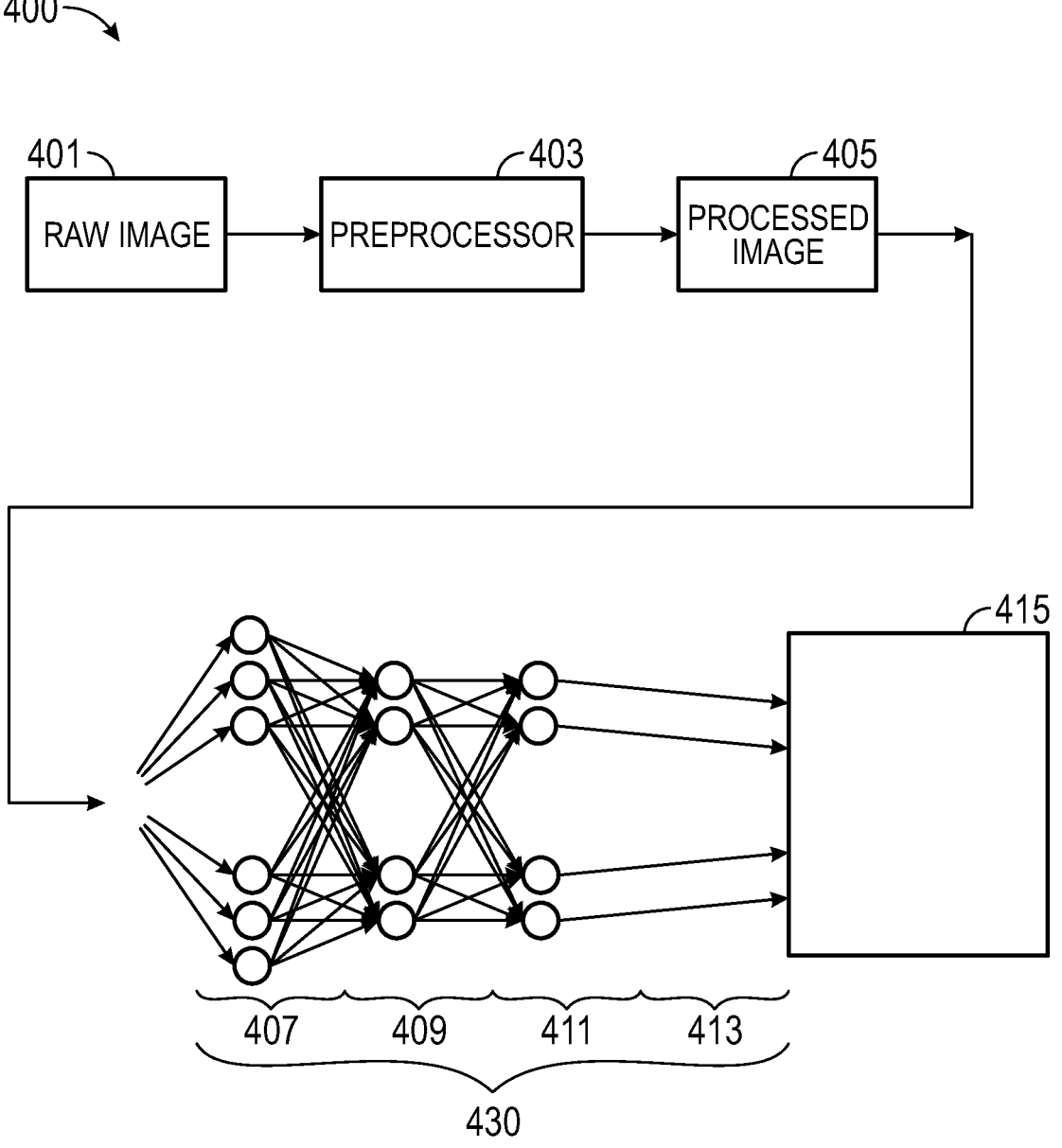
FIG. 4 shows an example of a machine-learning framework to perform anomaly detection and/or classification of images of features or characteristics from captured images on a substrate, in accordance with various embodiments of the disclosed subject matter.

FIG. 4 shows an example of a machine-learning framework to perform anomaly detection and/or classification of images of features or characteristics from captured images on a substrate, in accordance with various embodiments of the disclosed subject matter. As described above, the machine-learning framework 400 may be used in a training mode to train, for example, the self-supervised training component 105 (see FIG. 1).

As shown in FIG. 4, the machine-learning framework 400 is shown to include a preprocessor 403 and a machine-learning network 430. A raw image 401 (e.g., as received from the input data component 150 of FIG. 1) is provided to the preprocessor 403. In this example, the preprocessor 403 filters or otherwise processes the raw image 401 to, for example, crop, scale, extract data from, or otherwise change or enhance the raw image 401 and to generate a preprocessed image 405.

The preprocessed image 405 may then be input into the machine-learning network 430. The machine-learning network 430 may be provided as a multi-layered machine-learning model. For example, the machine-learning network 430 may include four layers including an input layer 407, a feature-extraction layer 409, a features-relationship layer 411, and a decision layer 413. In this exemplary model, the decision layer 413 may have a number of outputs. The outputs may include, e.g., a key point; a bounding box; a number of physical, optical, and electrical characteristics of dice or bumps; and other substrate-level, die-level, or layer-level characteristics regarding possible features found on a substrate for a particular fabrication process.

With continuing reference to FIG. 4, pixel information from the preprocessed image 405 may be sent to the input layer 407. Each node in the input layer 407 may correspond to a pixel of the preprocessed image 405. The machine-learning network 430 may, in an iterative fashion, may be trained in one or more of the layers 407 through 413. The decision layer 413 may output decisions regarding the various substrate characteristics of a given substrate, as noted above. The substrate characteristics are then generated in output box 415. The output box 415 may therefore store the extracted substrate-level, die-level, and layer-level characteristics from the raw image 401. In various embodiments, the output box 415 may provide a textual indication showing various characteristics (e.g., sheet resistance values, refractive indices, physical characteristics and sizes of features on a die). In various embodiments, values and/or characteristics within the output box 415 are provided as an input to the analysis engine 107 of FIG. 1.

Figure 5:
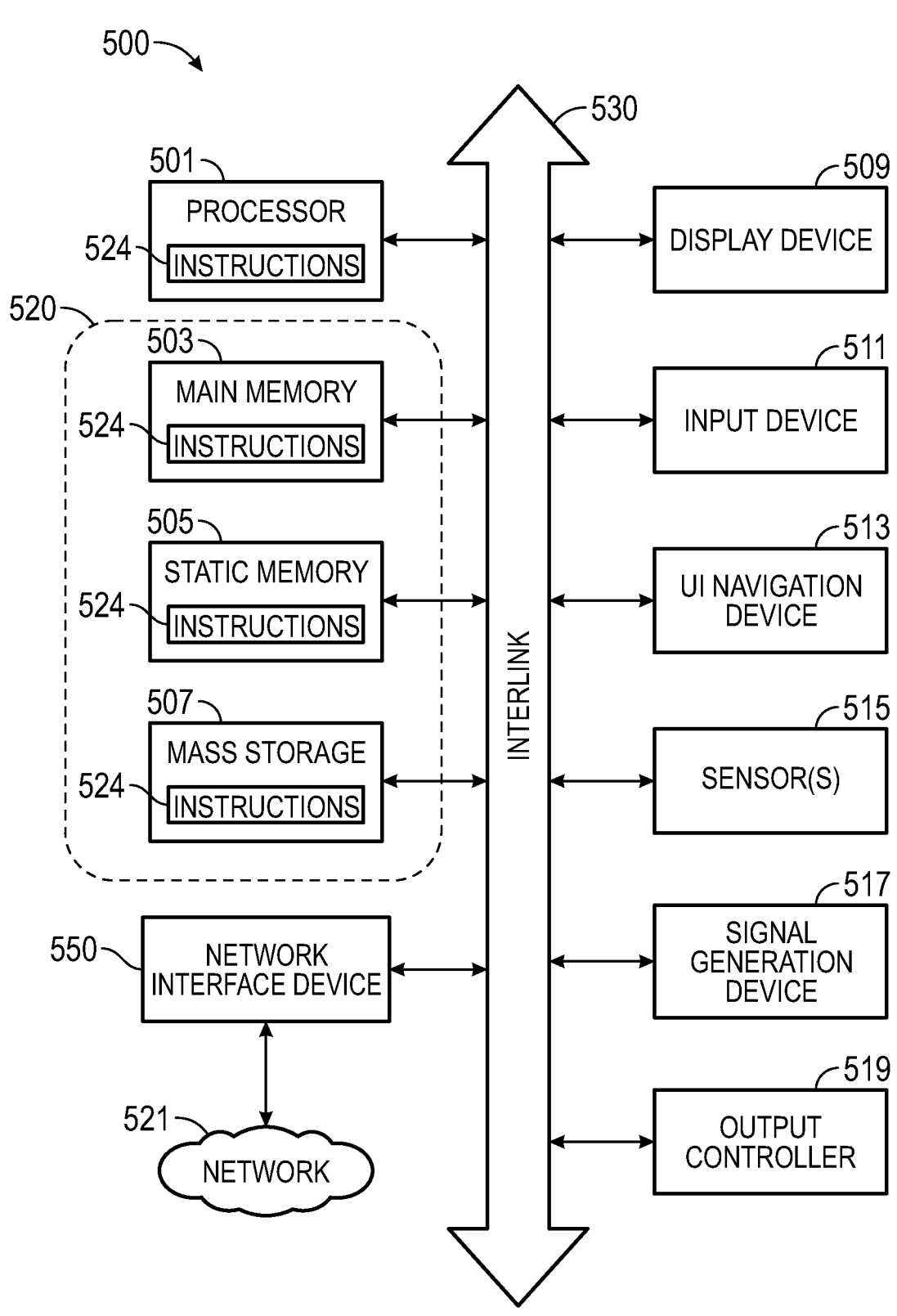
FIG. 5 shows a block diagram of an example comprising a machine upon which any one or more of the techniques (e.g., methodologies) discussed herein may be performed.

The methods and techniques shown and described herein can be performed using a portion or an entirety of a machine 500 as discussed below in relation to FIG. 5. FIG. 5 shows an exemplary block diagram comprising a machine 500 upon which any one or more of the techniques (e.g., methodologies) discussed herein may be performed. In various examples, the machine 500 may operate as a standalone device or may be connected (e.g., networked) to other machines.

In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer-readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 500 (e.g., computer system) may include a hardware-based processor 501 (e.g., a central processing unit (CPU), a graphics processing unit (GPU), a hardware processor core, or any combination thereof), a main memory 503 and a static memory 505, some or all of which may communicate with each other via an interlink 530 (e.g., a bus). The machine 500 may further include a display device 509, an input device 511 (e.g., an alphanumeric keyboard), and a user interface (UI) navigation device 513 (e.g., a mouse). In an example, the display device 509, the input device 511, and the UI navigation device 513 may comprise at least portions of a touch screen display. The machine 500 may additionally include a storage device 520 (e.g., a drive unit), a signal generation device 517 (e.g., a speaker), a network interface device 550, and one or more sensors 515, such as a global positioning system (GPS) sensor, compass, accelerometer, or other sensor. The machine 500 may include an output controller 519, such as a serial controller or interface (e.g., a universal serial bus (USB)), a parallel controller or interface, or other wired or wireless (e.g., infrared (IR) controllers or interfaces, near field communication (NFC), etc., coupled to communicate or control one or more peripheral devices (e.g., a printer, a card reader, etc.).

The storage device 520 may include a machine-readable medium on which is stored one or more sets of data structures or instructions 524 (e.g., software or firmware) embodying or utilized by any one or more of the techniques or functions described herein. The instructions 524 may also reside, completely or at least partially, within a main memory 503, within a static memory 505, within a mass storage device 507, or within the hardware-based processor 501 during execution thereof by the machine 500. In an example, one or any combination of the hardware-based processor 501, the main memory 503, the static memory 505, or the storage device 520 may constitute machine-readable media.

While the machine-readable medium is considered as a single medium, the term "machine-readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 524 may further be transmitted or received over a communications network 521 using a transmission medium via the network interface device 550 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., the Institute of Electrical and Electronics Engineers (IEEE) 802.22 family of standards known as Wi-Fi®, the IEEE 802.26 family of standards known as WiMax®), the IEEE 802.25.4 family of standards, peer-to-peer (P2P) networks, among others. In an example, the network interface device 550 may include one or more physical jacks (e.g., Ethernet, coaxial, or phone jacks) or one or more antennas to connect to the communications network 521. In an example, the network interface device 550 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

FIG. 6 shows an exemplary embodiment of a transformer encoder 600 that can be used in a transformer-based network, as described briefly above. The transformer-based network is one type of a self-attention-based machine learning (ML) model. The transformer-based network is frequently used in natural-language processing (NLP). However, the transformer model can also be applied directly to images. In one example, the transformer-based network can be trained on image classification in a supervised fashion. In various embodiments, inputs to the transformer may be pre-trained on a large number of images (e.g., 2D or 3D images). The results of the large number of pre-trained images may then be fine-tuned on smaller task-specific datasets (as described above with reference to the smaller networks 110 of FIG. 1). In embodiments, the transformer encoder 600 can also be trained in an unsupervised fashion as a generative model. A resulting representation can then be fine-tuned for classification performance.

An image (e.g., a 2D image, but no such limitation is needed) into fixed-size "patches." Each of the patches is linearly embedded, possibly with added position embeddings. The patches are then provided to the input 601 (the patches can be treated the same way as tokens (words) in an NLP application). A resulting sequence of vectors is provided as an input to the transformer encoder 300.

A local multi-head dot-product of self-attention blocks can be used to replace convolutions. Attention mechanisms initially used to process sequences of words in machine translation, which have an implied temporal aspect to them. However, attention can be generalized to process information that can be static, and not necessarily related in a sequential fashion, such as in the context of image processing as is described herein.

The input patches may be normalized as needed at a first normalization block 603. A multi-head attention block 605 can be used to sort visual information received from the normalization block 603. As discussed briefly above, "attention," in an ML sense, is an ability to highlight dynamically and use salient parts of the received information (e.g., the image inputs).

Self-attention can occur in parallel in the multi-head attention block 605, in which k self-attention operations can be run in parallel. A summation of values from the multi-head attention block 605 may be applied prior to a second normalization block 607.

An output from a summation of the multi-head attention block 605 and the normalization block 607 is then transferred to a multi-layer perception (MLP) block 609, which can act as a class-prediction layer. An additional summation may be applied prior to producing an output 611 from the transformer encoder 600.

As used herein, the term "or" may be construed in an inclusive or exclusive sense. Further, other embodiments will be understood by a person of ordinary skill in the art based upon reading and understanding the disclosure provided. Moreover, the person of ordinary skill in the art will readily understand that various combinations of the techniques and examples provided herein may all be applied in various combinations.

Throughout this specification, plural instances may implement components, operations, or structures described as a single instance. Although individual operations are illustrated and described as separate operations, one or more of the individual operations may be performed concurrently, and, unless otherwise stated, nothing requires that the operations necessarily be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter described herein.

Further, although not shown explicitly but understandable to a skilled artisan, each of the various arrangements, quantities, and number of elements may be varied (e.g., the number of task-specific neural networks, the number of metrology tools, the number of inspection tools, etc.). Moreover, each of the examples shown and described herein is merely representative of one possible configuration and should not be taken as limiting the scope of the disclosure.

Although various embodiments are discussed separately, these separate embodiments are not intended to be considered as independent techniques or designs. As indicated above, each of the various portions may be inter-related and each may be used separately or in combination with other embodiments discussed herein. For example, although various embodiments of operations, systems, and processes have been described, these methods, operations, systems, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to ascertain quickly the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

The description provided herein includes illustrative examples, devices, and apparatuses that embody various aspects of the matter described in this document. In the description, for purposes of explanation, numerous specific details are set forth in order to provide an understanding of various embodiments of the matter discussed. It will be evident however, to those of ordinary skill in the art, that various embodiments of the disclosed subject matter may be practiced without these specific details. Further, well-known structures, materials, and techniques have not been shown in detail, so as not to obscure the various illustrated embodiments. As used herein, the terms "about," "approximately," and "substantially" may refer to values that are, for example, within +10% of a given value or range of values.

THE FOLLOWING NUMBERED EXAMPLES
ARE SPECIFIC EMBODIMENTS OF THE
DISCLOSED SUBJECT MATTER

Example 1: A system to provide comparison data in a fabrication facility. The system includes a common-backbone network based on a machine learning-based network (e.g., such as at least one of a convolutional-neural network (convnet) and a transformer-based network). The common-backbone network includes an input component to receive raw-image data; a self-supervised training component to generate a machine learning-based comparison database (e.g., such as at least one of a convolutional-neural network (convnet) and a transformer-based comparison database) from the raw-image data; and an analysis engine to perform anomaly detection and classification of images received from a plurality of task-specific networks electronically coupled to the common-backbone network. Each of the plurality of task-specific networks is coupled to at least one type of equipment selected from an equipment type including a metrology tool and an inspection tool, the analysis engine to convert the raw-image data into features that are to be transmitted to the plurality of task-specific networks to perform final calculations of specific tasks within the fabrication facility.

Example 2: The system of Example 1, wherein the raw-image data include acquired images and reference images.

Example 3: The system of either Example 1 or Example 2, wherein the reference images include CAD-based reference images and reference-die images.

Example 4: The system of any one of the prior Examples, wherein the common-backbone network is further configured to extract image features and align and scale the image features to image data provided to an input data component.

Example 5: The system of Example 4, wherein the image features are to be transmitted to the plurality of task-specific networks to make a determination of defects within the fabrication facility.

Example 6: The system of any one of the prior Examples, wherein the raw-image data can be used to train a backbone network without a requirement for labeling each component of the raw-image data.

Example 7: The system of any one of the prior Examples, wherein the analysis engine is further configured to compare images received from the plurality of task-specific networks with related ones of images in the comparison database generated from the raw-image data.

Example 8: An image-processing system to categorize defects in a fabrication facility. The image-processing system including a common-backbone network based on a machine learning-based network (e.g., such as at least one of a convolutional-neural network (convnet) and a transformer-based network); and a plurality of task-specific networks electronically coupled to the common-backbone network. Each of the plurality of task-specific networks is based on at a machine learning-based network (e.g., such as at least one of a convolutional-neural network (convnet) and a transformer-based network) that is separate from the common-backbone network, each of the plurality of task-specific networks configured to be trained for a specific task within the fabrication facility.

Example 9: The image-processing system of Example 8, wherein the common-backbone network comprises: an input component to receive raw-image data; a self-supervised training component to produce a comparison database from the raw-image data; and an analysis engine to perform anomaly detection and classification of images received from the plurality of task-specific networks, the analysis engine to convert the raw-image data into features that are to be transmitted to the plurality of task-specific networks to perform final calculations of specific tasks within the fabrication facility.

Example 10: The image-processing system of Example 9, wherein the analysis engine is further configured to compare images received from the plurality of task-specific networks with related ones of images in the comparison database generated from the raw-image data.

Example 11: The image-processing system of Example 9, wherein each of the plurality of task-specific networks is configured to perform operations of defect detection and die-to-die comparisons based on the features received from the analysis engine of the common-backbone network.

Example 12: The image-processing system of any one of Example 8 through Example 11, wherein each of the plurality of task-specific networks are to be coupled to and collect data from at least one type of tool including a metrology tool and an inspection tool.

Example 13: The image-processing system of any one of Example 8 through Example 12, wherein each of the plurality of task-specific networks is trained to ignore normal process variations for a particular process based on a predetermined tolerance value.

Example 14: The image-processing system any one of Example 8 through Example 12, wherein each of the plurality of task-specific networks are customized with task-specific recipes for a particular process.

Example 15: A method for comparing data in a fabrication facility. The method including receiving raw-image data as inputs to a common-backbone network, where the common-backbone network is based on a machine learning-based network (e.g., such as at least one of a convolutional-neural network (convnet) and a transformer-based network); using self-supervised training for generating at least one of a machine learning-based comparison database (e.g., such as at least one of a convolutional-neural network (convnet) comparison database and a transformer-based network comparison database) from the raw-image data; performing anomaly detection and classification of images received from a plurality of task-specific networks electronically coupled to the common-backbone network; and converting the raw-image data into features and transmitting the features to the plurality of task-specific networks.

Example 16: The method of Example 15, further comprising performing final calculations of specific tasks within the fabrication facility based on the features.

Example 17: The method of either one of either one of Example 15 or Example 16, further comprising using transfer learning for training a final application for each of the plurality of task-specific networks.

Example 18: The method of any one of Example 15 through Example 17, further comprising: extracting image features; and aligning and scaling the image features to a common-coordinate system from the raw-image data within the common-backbone network.

Example 19: The method of any one of Example 15 through Example 18, further comprising comparing images received from the plurality of task-specific networks with related ones of images in the comparison database generated from the raw-image data.

Example 20: The method of any one of Example 15 through Example 19, further comprising receiving the images from at least one of the plurality of task-specific networks from at least one type of tool selected from a tool type including a metrology tool and an inspection tool.

What is claimed is:

1. A system to provide comparison data in a fabrication facility, the system comprising:
   a common-backbone network based on a machine-learning-based network, the common-backbone network including:
   an input component to receive raw-image data;
   a self-supervised training component to generate a machine-learning-based comparison labels from the raw-image data; and
   an analysis engine to perform anomaly detection and classification of images received from a plurality of task-specific networks provided at edge nodes electronically coupled to the common-backbone network, each of the plurality of task-specific networks being coupled to at least one type of equipment, the analysis engine to convert the raw-image data into features that are to be transmitted to the plurality of task-specific networks to perform final calculations of specific tasks within the fabrication facility.

2. The system of claim 1, wherein the raw-image data include acquired images and reference images.

3. The system of claim 2, wherein the reference images include CAD-based reference images and reference-die images.

4. The system of claim 1, wherein the common-backbone network is further configured to extract image features and align and scale the image features to image data provided to an input data component.

5. The system of claim 4, wherein the image features are to be transmitted to the plurality of task-specific networks to make a determination of defects within the fabrication facility.

6. The system of claim 1, wherein the raw-image data can be used to train a backbone network without a requirement for labeling each component of the raw-image data.

7. The system of claim 1, wherein the analysis engine is further configured to compare images received from the plurality of task-specific networks with related ones of images in the machine-learning-based comparison labels generated from the raw-image data.

8. The system of claim 1, wherein the machine-learning-based network is based on at least one of a convolutional-neural network (convnet) and a transformer-based network.

9. An image-processing system to categorize defects in a fabrication facility, the image-processing system comprising:
   a common-backbone network based on a machine-learning-based network; and
   a plurality of task-specific networks provided at edge nodes electronically coupled to the common-backbone network, each of the plurality of task-specific networks based on a machine-learning-based network that is separate from the common-backbone network, each of the plurality of task-specific networks configured to be trained for a specific task within the fabrication facility,
   wherein the common-backbone network comprises:
   an input component to receive raw-image data;
   a self-supervised training component to produce a machine-learning-based comparison labels from the raw-image data; and
   an analysis engine for performing anomaly detection and classification of images received from the plurality of task-specific networks, the analysis engine for converting the raw-image data into features that are to be transmitted to the plurality of task-specific networks for performing final calculations of specific tasks within the fabrication facility.

10. The image-processing system of claim 9, wherein the machine-learning-based comparison labels is based on at least one of a convolutional-neural network (convnet) and a transformer-based network.

11. The image-processing system of claim 9, wherein the analysis engine is further configured to compare images received from the plurality of task-specific networks with related ones of images in the machine-learning-based comparison labels generated from the raw-image data.

12. The image-processing system of claim 9, wherein each of the plurality of task-specific networks is configured to perform operations of defect detection and die-to-die comparisons based on the features received from the analysis engine of the common-backbone network.

13. The image-processing system of claim 9, wherein each of the plurality of task-specific networks are to be coupled to and collect data from at least one type of equipment including a metrology tool and an inspection tool.

14. The image-processing system of claim 9, wherein each of the plurality of task-specific networks is trained to ignore normal process variations for a particular process based on a pre-determined tolerance value.

15. The image-processing system of claim 9, wherein each of the plurality of task-specific networks are customized with task-specific recipes for a particular process.

16. The image-processing system of claim 9, wherein each of the machine-learning-based networks is based on at least one of a convolutional-neural network (convnet) and a transformer-based network.

17. A method for comparing data in a fabrication facility, the method comprising:
  receiving raw-image data as inputs to a common-backbone network, the common-backbone network based on a machine-learning-based network;
  using self-supervised training for generating a machine-learning-based comparison labels from the raw-image data;

performing anomaly detection and classification of images received from a plurality of task-specific networks provided at edge nodes electronically coupled to the common-backbone network;
  converting the raw-image data into features and transmitting the features to the plurality of task-specific networks; and
  performing final calculations of specific tasks within the fabrication facility based on the features.

18. The method of claim 17, further comprising using transfer learning for training a final application for each of the plurality of task-specific networks.

19. The method of claim 17, further comprising:
  extracting image features; and
  aligning and scaling the image features to a common-coordinate system from the raw-image data within the common-backbone network.

20. The method of claim 17, further comprising comparing images received from the plurality of task-specific networks with related ones of images in the machine-learning-based comparison labels generated from the raw-image data.

21. The method of claim 17, further comprising receiving the images from at least one of the plurality of task-specific networks from at least one type of equipment selected from an equipment type including a metrology tool and an inspection tool.

22. The method of claim 17, wherein the machine-learning-based network is based on at least one of a convolutional-neural network (convnet) and a transformer-based network.

23. The system of claim 1, wherein each of the plurality of task-specific networks being separate from the common-backbone network, each of the plurality of task-specific networks configured to be trained for a specific task within the fabrication facility.

24. The method of claim 17, wherein each of the plurality of task-specific networks being separate from the common-backbone network, each of the plurality of task-specific networks configured to be trained for a specific task within the fabrication facility.

* * * * *